United States Patent
Yamamoto et al.

(10) Patent No.: US 9,908,367 B2
(45) Date of Patent: Mar. 6, 2018

(54) DOUBLE-LOCK CASTER

(71) Applicant: NANSIN CO., LTD., Tokyo (JP)

(72) Inventors: Takahiro Yamamoto, Inzai (JP); Noriyuki Iiyama, Inzai (JP)

(73) Assignee: NANSIN CO., LTD., Tokyo (JP)

( * ) Notice: Subject to any disclaimer, the term of this patent is extended or adjusted under 35 U.S.C. 154(b) by 15 days.

(21) Appl. No.: 15/116,977

(22) PCT Filed: Feb. 7, 2014

(86) PCT No.: PCT/JP2014/052976
§ 371 (c)(1),
(2) Date: Aug. 5, 2016

(87) PCT Pub. No.: WO2015/118672
PCT Pub. Date: Aug. 13, 2015

(65) Prior Publication Data
US 2017/0173998 A1 Jun. 22, 2017

(51) Int. Cl.
*B60B 33/02* (2006.01)
*B60B 33/00* (2006.01)

(52) U.S. Cl.
CPC ........ *B60B 33/021* (2013.01); *B60B 33/0039* (2013.01); *B60B 33/0078* (2013.01);
(Continued)

(58) Field of Classification Search
CPC .... A45C 5/145; A61G 1/0243; A61G 1/0287; A61G 2007/0528; A61G 5/1005;
(Continued)

(56) References Cited

U.S. PATENT DOCUMENTS 5,184,373 A * 2/1993 Lange ................ B60B 33/00
16/35 R
5,242,035 A * 9/1993 Lange ................ B60B 33/021
16/35 R
(Continued)

FOREIGN PATENT DOCUMENTS

JP 56-63501 A 5/1981
JP 2001-1703 A 1/2001
(Continued)

OTHER PUBLICATIONS

International Search Report dated Apr. 15, 2014, issued in counterpart International Application No. PCT/JP2014/052976 (1 page).
(Continued)

*Primary Examiner* — Jeffrey O Brien
(74) *Attorney, Agent, or Firm* — Westerman, Hattori, Daniels & Adrian, LLP (57) ABSTRACT

An operating shaft rises and falls by abutting against a cam surface of a cam rotatably built into the upper part of a stem. A swivel-preventing plate part is fixed to the lower end of the operating shaft. An engagement member is fixed to a support yoke and regulates the swiveling by engaging with the swivel-preventing plate part. A brake shoe part is fixed to the lower part of the swivel-preventing plate part and brakes by abutting against a treat surface of a wheel when the operating shaft falls. A link cam causes a link cam to pivot and causes a brake plate to rise and fall by connected to the brake shoe part. A protruding part for braking, by displacement of the brake plate, is capable of engaging with and disengaging from an annular engagement receiving part formed in the inner periphery of the wheel.

9 Claims, 6 Drawing Sheets

(52) U.S. Cl.
CPC ...... *B60B 33/0081* (2013.01); *B60B 33/0057* (2013.01); *B60B 33/0068* (2013.01)

(58) Field of Classification Search
CPC .... A61G 5/1008; A61G 5/101; A61G 5/1013; A61G 5/1016; A61G 5/1018; A61G 5/1021; A61G 5/1029; B62B 2301/04; B62B 2301/046; B62B 2301/0465; B62B 2301/0467
See application file for complete search history.

(56) References Cited

U.S. PATENT DOCUMENTS

| | | | | |
|---|---|---|---|---|
| 5,303,450 | A * | 4/1994 | Lange | B60B 33/021 16/35 D |
| 5,774,936 | A * | 7/1998 | Vetter | B60B 33/021 16/35 R |
| 6,865,775 | B2 * | 3/2005 | Ganance | A61G 7/00 16/35 R |
| 7,406,745 | B2 * | 8/2008 | Chou | B60B 33/0021 16/35 R |
| 7,506,404 | B2 * | 3/2009 | Block | B60B 33/0021 16/18 R |
| 7,810,613 | B2 * | 10/2010 | Lin | B60B 33/0021 16/35 R |
| 7,810,822 | B2 * | 10/2010 | Figel | A61G 1/04 188/29 |
| 8,051,533 | B2 * | 11/2011 | Block | B60B 33/0028 16/35 R |
| 8,850,657 | B1 * | 10/2014 | Yang | B60B 33/0042 16/18 R |
| 9,139,043 | B1 * | 9/2015 | Fan | B60B 33/0028 |
| 9,139,044 | B1 * | 9/2015 | Tsai | B60B 33/021 |
| 2011/0067202 | A1 * | 3/2011 | Chou | B60B 33/0021 16/45 |
| 2012/0255141 | A1 * | 10/2012 | Lin | B60B 33/0081 16/45 |
| 2017/0106696 | A1 * | 4/2017 | Schulte | A47C 17/86 |

FOREIGN PATENT DOCUMENTS

| | | |
|---|---|---|
| JP | 2005-306190 A | 11/2005 |
| JP | 2008-1355 A | 1/2008 |

OTHER PUBLICATIONS

Written Opinion dated Apr. 15, 2014, issued in counterpart International Application No. PCT/JP2014/052976, w/ English translation (7 page).

International Preliminary Report on Patentability (Form PCT/IPEA/409) dated Feb. 12, 2016, issued in counterpart International Application No. PCT/JP2014/052976, w/English translation (25 page).

* cited by examiner

DOUBLE-LOCK CASTER

TECHNICAL FIELD

The present invention relates to a double-lock caster having a simple structure which can regulate swiveling of a wheel of the caster and is capable of double-brake-locking the wheel of the caster.

BACKGROUND ART

As a structure which performs braking of a caster, a structure which presses a brake shoe against a tread surface of the caster to stop rotation of a wheel has been known (Japanese Unexamined Patent Application Publication No. Sho 56-63501).

On the other hand, there is also known a structure having lock receiving parts which concentrically have small diameters, are formed like internally toothed gears, and annularly aligned on a side surface of a wheel, a protruding part being ejected from or retracted into the lock receiving parts to brake the wheel (Japanese Unexamined Patent Application Publication No. 2001-1703).

However, when any one of these braking structures is used, there is fear that braking is not effective when a heavy load is applied to a caster.

Thus, in a double-lock caster disclosed in Japanese Unexamined Patent Applicant Publication No. 2008-1355, the present applicant has proposed, as a structure having a braking mechanism doubly provided to a caster, a structure having a first brake shoe which is pivoted to a support yoke pivotally supporting a wheel, can displace a lock member pivoted to the support yoke between a first braking position at which the lock member abuts against a tread surface of the wheel and a first-braking release position at which the lock member is away from the tread surface, and is energized in a direction of the first braking release position to serve as a first brake, and a brake plate which is interlockably coupled with the lock member, slidable so that it can move forward and backward along the support yoke, advances to a second braking position at which an engagement part at a distal end is engaged with an engagement receiving part formed of continuous irregularities annularly formed on an inner peripheral side surface of the wheel when the brake shoe is displaced to the first braking position, retreats to a second braking release position at which the engagement part is separated from the engagement, receiving part when the brake shoe is displaced to the first braking release position, and is energized in a direction of the second braking release position.

Further, the brake plate is disposed to the inner side of a side surface of the support yoke and has a long hole into which an axle of the wheel is fitted and which is set to a length of a sliding stroke of the brake plate, a guide part which guides sliding of the brake plate is provided on an inner wall surface of the support yoke or the brake plate, and the brake plate is advanced or retreated in an up-and-down direction along a diametric direction of the wheel to engage the engagement part with the engagement receiving part.

In the above-described structure, a folded part of a swiveling lock piece constituted of a spring material formed into a pin shape having upper and lower pieces is disposed to the support yoke, the swiveling lock piece is configured to be latched to the lock member in a state where the upper and lower pieces are opened, the brake plate has a complicated structure since an upper part of the brake plate is interlockably coupled with the lock member, and regulation of swiveling alone cannot be performed separately from braking.

CITATION LIST

Patent Literatures

Patent Literature 1: Japanese Unexamined Patent Application Publication No. Sho 56-63501
Patent Literature 2: Japanese Unexamined Patent Application No. 2001-1703
Patent Literature 3: Japanese Unexamined Patent Application Publication No. 2008-1355

DISCLOSURE OF INVENTION

Problem to be Solved by the Invention

A problem to be solved by the present invention is to provide a double-lock caster which can slide a brake plate along a support yoke by using a link cam pivoted to a brake shoe.

Another problem to be solved by the present invention is to provide a double-lock caster which enables locking separately from swiveling regulation and braking, also enables locking with braking, and can be easily assembled.

Still another problem to be solved by the present invention, is to provide a double-lock caster in which an engagement member engaging with a swivel-preventing plate is held by the support yoke and fixed.

Means for Solving Problem

To solve the problems, according the present invention, the invention according to claim 1 is characterized by comprising: a stem erected on a support yoke which pivotally supports a wheel; a cam which is incorporated in an upper part of the stem and rotates by a rotary shaft; a plurality of braking and braking release cam surfaces formed at predetermined positions on an outer peripheral surface of the cam; an operating shaft which abuts against the cam surfaces and slides up and down; a swivel-preventing plate part fixed to a lower end of the operating shaft; an engagement member which is fixed to the support yoke, and engages with the swivel-preventing plate part to regulate swiveling of the support yoke; a brake shoe part which is fixed to a lower part of the swivel-preventing plate part, and abuts against a tread surface of the wheel by downward movement of the operating shaft to perform braking; a link cam which is coupled with the brake shoe part, and has one end side pivotally supported by a bearing part extending to an outer side of the wheel and the other end side being latched on a brake plate which slides up and down along an outer surface of the support yoke; and a braking protruding part which is provided on the brake plate and engageable with an annularly continuous engagement receiving part for rued on an inner peripheral side surface of the wheel, downward movement of the operating shaft causing the engagement member to engage with the swivel-preventing plate part and causing the brake shoe part to abut against the tread surface of the wheel and, at the same time, pivotal movement of the link cam causing the brake plate to slide so that the braking protruding part engages with the engagement receiving part of the wheel, thereby performing swivel regulation and double braking;

a vertically extending slit is formed in a back surface of the support yoke, and a rail part having a T-like cross section is provided to protrude on a back surface of a support member which supports the engagement member, and a central piece of the rail part is inserted into the slit to latch the support member on the support yoke.

The invention according to claim 3 is characterized in that a through hole which communicates with holes provided in side surfaces of the support yoke and laterally extends is provided in the support member, a part of the hole of the through hole is set to a press fitting dimension, and the engagement member is fixed to the support yoke through the support member by press-fitting the fixing shaft.

The invention according to claim 4 is characterized in that the swivel-preventing plate part is formed into a plate-like shape, and has engagement receiving parts provided on an upper surface and a lower surface thereof, the engagement member has a pair of engagement parts which are vertically apart from each other, the receiving part on the upper surface of the swivel-preventing plate part becomes engageable with the upper engagement part by a displacement of the operating shaft, and the receiving part on the lower surface of the swivel-preventing, plate part becomes engageable with the lower engagement part by a further displacement of the operating shaft.

The invention according to claim 5 is characterized in that a pair of hook-like bearing parts which extend downward on outer sides of left and right side surfaces of the wheel and have folded distal ends are provided to the brake shoe, a protruding pivot is born by the hook parts in the vicinity of a proximal end of the link cam, and a distal end of the link cam is locked to a pair of brake plates which slide up and down along outer surfaces of left and right side surfaces of the support yoke.

The invention according to claim 6 is characterized in that the swivel-preventing plate part is formed by a cold forging process, and the engagement receiving part on the lower surface is formed of many annularly continuously arranged irregularities, and grooves are provided along proximal ends of convex gear parts respectively.

The invention according to claim 7 is characterized by comprising:

a stem erected on a support yoke which pivotally supports a wheel; a cam which is incorporated in an upper part of the stem and rotates by a rotary shaft; a plurality of braking and braking release cam surfaces formed at predetermined positions on an outer peripheral surface of the cam; an operating shaft which abuts against the cam surfaces and slides up and down; a swivel-preventing plate part fixed to a lower end of the operating shaft; an engagement member which is fixed to the support yoke, and engages with the swivel-preventing plate part to regulate swiveling of the support yoke; a brake shoe part which is fixed to a lower part of the swivel-preventing plate part, and abuts against a tread surface of the wheel by downward movement of the operating shaft to perform braking; a link cam which is coupled with the brake shoe part, and has one end side pivotally supported by a bearing part extending to an outer side of the wheel and the other end side being latched on a brake plate which slides up and down along an outer surface of the support yoke; and a braking protruding part which is provided on the brake plate and engageable with an annularly continuous engagement receiving part formed on an inner peripheral side surface of the wheel, wherein downward movement of the operating shaft causes the engagement member to engage with the swivel-preventing plate part and causes the brake shoe part to abut against the tread surface of the wheel and, at the same time, pivotal movement of the link cam causes the brake plate to slide so that the braking protruding part engages with the engagement receiving part of the wheel, thereby performing swivel regulation and double braking;

wherein a pair of hook-like beating parts which extend downward on outer sides of left and right side surfaces of the wheel and have folded distal ends are provided to the brake shoe, a protruding pivot is born by the hook parts in the vicinity of a proximal end of the link cam, and a distal end of the link cam is locked to a pair of brake plates which slide up and down along outer surfaces of left and right side surfaces of the support yoke.

The invention according to claim 8 is characterized in that the vertically extending slit is formed in a back surface of the support yoke, and the rail part having a T-like cross section is provided to protrude on a back surface of a support member which supports the engagement member, and the central piece of the rail part is inserted into the slit to latch the support member on the support yoke.

Effect of the Invention

According to the present invention, the brake shoe is moved up and down by the movement of the operating shaft which moves up and down by rotation of the cam, the link cam pivotally supported on the brake shoe side is pivotally moved so that the brake plate can slide up and down, and hence double braking using the brake shoe and the brake plate can be assuredly performed with the simple structure.

Further, since the rail part having the T-shaped cross section is provided to the support member which supports the engagement member for swiveling regulation, and the rail part can be attached by being inserted into the slit formed in the back surface of the support yoke without using fixed metal fittings such as a rivet or a bolt.

The through hole laterally extending with the support yoke is provided in the support member, a part of the hole of the through hole is set to the press fitting dimension, and hence just press-fitting the fixing shaft enables fixing the shaft without performing, e.g., caulking.

Furthermore, when the swivel-preventing plate part is formed by the cold forging process, engagement force can be enhanced by providing the grooves along the proximal ends of the gear parts.

BRIEF DESCRIPTION OF DRAWINGS

FIG. 10(*a*) is a partially enlarged view of a conventional structure in which grooves are not provided to a gear part, and FIG. 10(*b*) is a partially enlarged view of an embodiment in which the grooves are provided to the gear part.

BEST MODE(S) FOR CARRYING OUT THE INVENTION

A preferred embodiment of a double-lock caster according to the present invention will now be described hereinafter with reference to the drawings.

Embodiment 1

This double-lock caster 1 includes: a stem 4 erected on a support yoke 3, which pivotally supports a wheel 2, through a bearing part B; a cam 6 which is incorporated in an upper portion of the stem 4, rotates by a rotary shaft 5, and has a plurality of (three in the illustrated example) cam surfaces 7 for locking; an operating shaft 8 which abuts against the cam surfaces 7 displaced by rotation of the cam 6 and slides up and down through the inside of the stem 4 and the support yoke 3; and a brake device which interlocks with upward and downward displacements of the operating shaft 8 to brake-lock and unlock the wheel 2.

In this embodiment, the cam surfaces 7 are composed of a first cam surface 7*a* which performs swivel regulation, a second cam surface 7*b* which performs the swivel regulation/braking, and a third cam surface 7*c* which performs unlocking.

In the illustrated example, the third cam surface 7*c* is provided at a central neutral position, the second cam surface 7*b* is arranged in the clockwise direction in the drawing, and the first cam surface 7*a* is arranged in the counterclockwise direction in the drawing.

In this embodiment, the brake device is constituted of a swivel-regulation part which restrains swivel of the support yoke and a brake part which restrains rotation of the wheel.

Moreover, the swivel regulation is carried out by a swivel-preventing plate part 9 fixed to a lower portion of the operating shaft 4 and an engagement member 10 having a pair of upper and lower engagement claw parts 10*a* and 10*b* which engage with each other when the swivel-preventing plate part 9 is displaced to a predetermined height position.

Additionally, the brake is doubly provided in this embodiment, one is a brake shoe part 11 which is provided to a lower portion of the swivel-preventing plate part 9 and presses a tread surface of the wheel, and the other is constituted of an arm-like link cam 12 which interlocks with upward and downward movements of the brake shoe part 11 to pivotally move and a brake plate 25 having a braking protruding part 14 which moves up and down along an outer surface of the support yoke by the link cam 12 and is latched on an engagement receiving part 13 constituted of annular irregularities formed on an inner periphery of the wheel 2.

That is, long holes 31 which enable moving up and down the braking protruding part 14 of the brake plate 25 are formed in the support yoke 3, the braking protruding part 14 is provided to protrude on the inner side of the support yoke 3, and the braking protruding part 14 can be latched on the engagement receiving part 13 of the wheel 2.

Figure 9:
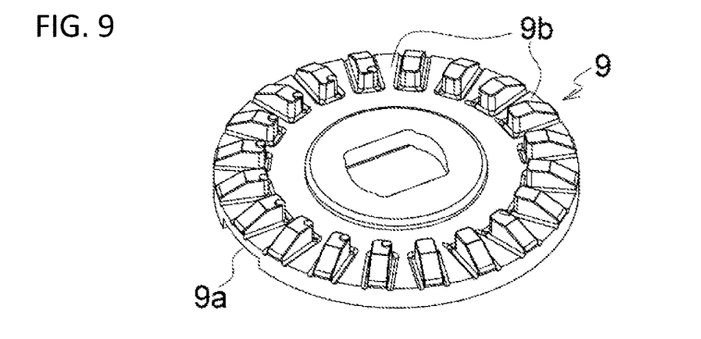
FIG. 9 is a perspective view of a swivel-preventing plate part seen from a bottom side.

The swivel-preventing plate part 9 fixed to a lower end of the operating shaft 8 is formed into a plate-like shape as shown in FIG. 9 and constituted of many gear-like portions annularly continuously arranged on an upper surface and a lower surface (they are turned upside down in the drawing), and concave parts formed between convex gear parts are determined as engagement receiving parts 9*a* and 9*b*.

Pitches of irregularities of the receiving parts 9*a* on the upper surface and the receiving parts 9*b* on the lower surface at the time of installation may be different from each other, and a longer pitch is set on the upper surface whilst a shorter pitch is set on the lower surface in the illustrated example.

Figure 10:
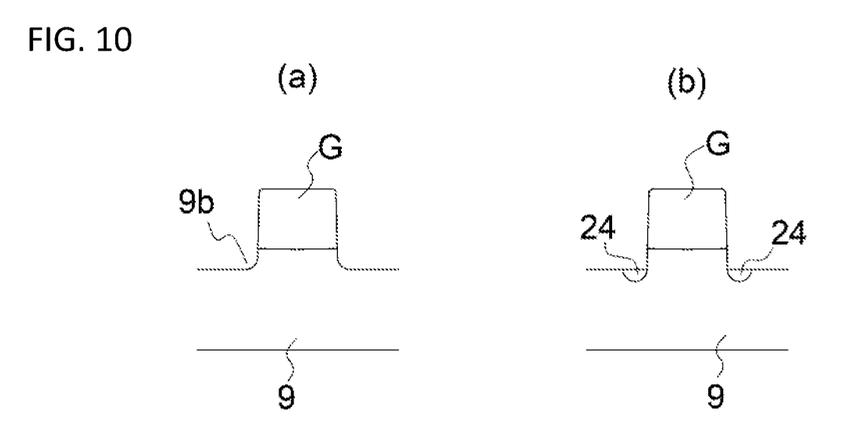

Further, in a case where the swivel-preventing plate part 9 is formed by the cold forging process, when the engagement receiving parts 9*b* or the like are formed of many annularly continuously arranged irregularities, a proximal end of each convex gear part G has an R-like shape in conventional examples as shown in FIG. 10(*a*), and hence providing each groove 24 as shown in FIG. 10(*b*) can improve engagement force.

The engagement member 10 can be fixed to the support yoke 3 by simple work as shown in FIG. 3 to FIG. 6.

That is, as described above, the engagement member 10 is fixed at a position where it engageably faces the receiving parts 9*a* and 9*b* of the swivel-preventing plate part 9.

Although the engagement member 10 is fixed to a support member 16 which serves as a housing in the illustrated example, these members may be integrally formed.

Further, the support member 16 vertically extends with a rail part 17 having a T-shaped lateral cross section provided on a back surface thereof in a protruding manner.

On the other hand, a vertically extending slit 15 is formed at the center of the back surface of the support yoke 3.

Thus, when a central piece of the rail part 17 of the support member 16 is inserted into the slit 15 and the support member 16 is latched on the support yoke 3, the engagement claw parts 10*a* and 10*b* can be positioned at predetermined locations on the swivel-preventing plate part 9 facing the engagement claw parts 10*a* and 10*b*.

A through hole 16*a* which laterally extends with a hole 32 of the support yoke 3 is provided in the support member 16, a part of the hole of the through hole 16*a* is set to a press fitting dimension slightly shorter than the other part of the same, and hence just press-fitting a fixing shaft 20 (see FIG. 5) enables fixing the support member 16 (and the engagement member 10) to the support yoke 3 at a regulated lock standby position with the use of the shaft 20 without performing caulking or the like.

Then, the brake shoe part 11 is fixed to the lower surface of the swivel-preventing plate part S in the vicinity of the center thereof except the receiving part 9*a*, and has an inclined braking surface facing the tread surface of the wheel 2.

Figure 7:
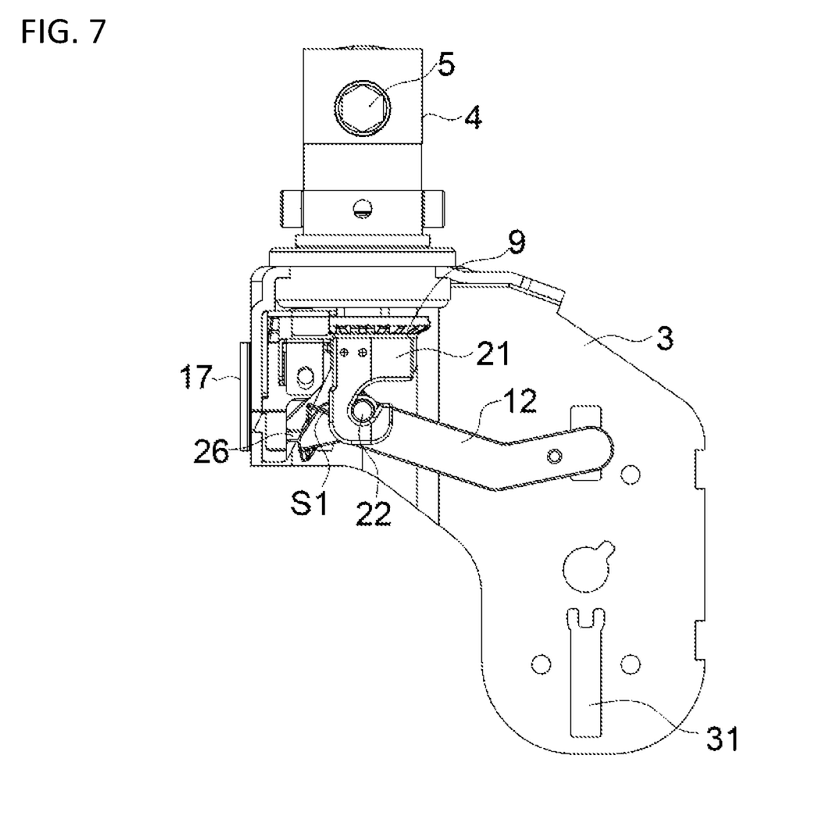
FIG. 7 is an explanatory view showing a structure of a link cam.

Hook parts 21 which extend downward and bend in a substantially arc-like shape at lower ends are formed on both left and right sides of this brake shoe part 11 in gaps between an outer side of side surfaces of the wheel 2 and an inner side of the support yoke 3 (see FIG. 7).

A pivot 22 which protrudes outward at a midway position of the link cam 12 close to the proximal end thereof is provided to each hook part 21, and the pivot 22 is inserted into a substantially semicircular concave part of each hook part 21.

Further, a spring material SI which is fitted onto the pivot 22, stretched between the link cam 12 and the brake shoe part 11, and energizes the link cam 12 in a braking release direction is disposed to the link cam 12.

A distal end of the link cam 12 is latched on the brake plate 25, and a proximal end of the same has a pivotal movement range regulated by the support member 16 or a restraint part 26 formed on the engagement member 10.

Thus, when each hook part 21 moves down with the brake shoe part 11 by downward movement of the operating shaft 8, the link cam 12 is pushed down through the shaft part 22, force to push down the proximal end side functions by the restraint part 26, and the link cam 12 is pivotally moved in the clockwise direction in the drawing.

Figure 2:
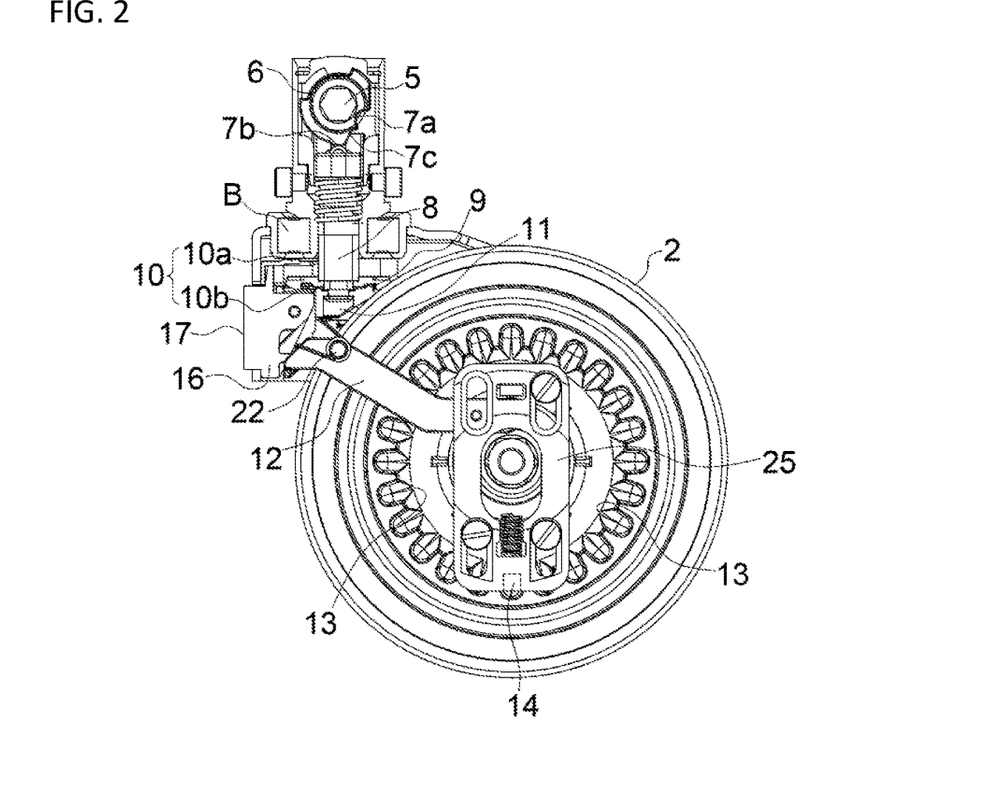
FIG. 2 is a side elevation of a double-locked caster in which the support yoke is omitted.
Figure 3:
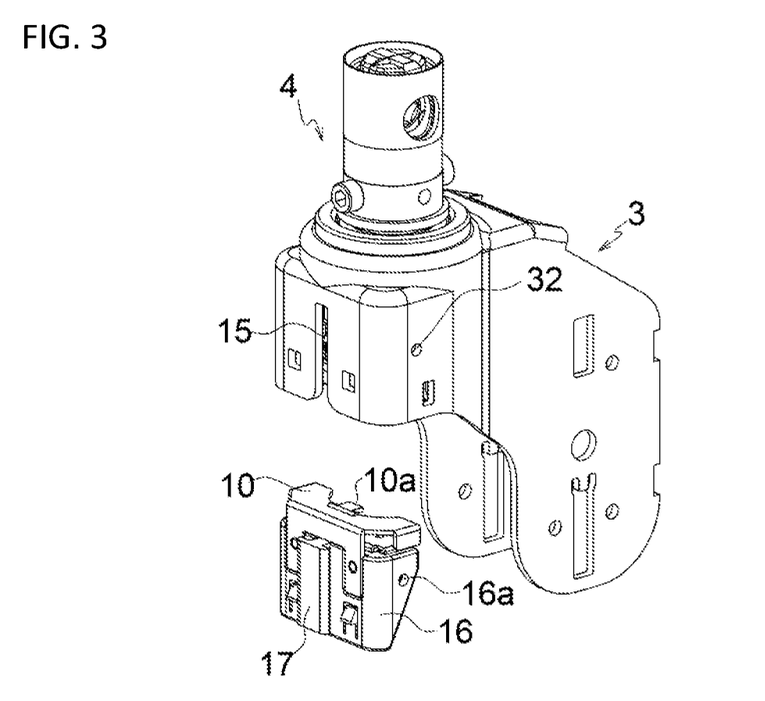
FIG. 3 is an exploded perspective view of a state where a support member of an engagement member is disposed to the support yoke.
Figure 4:
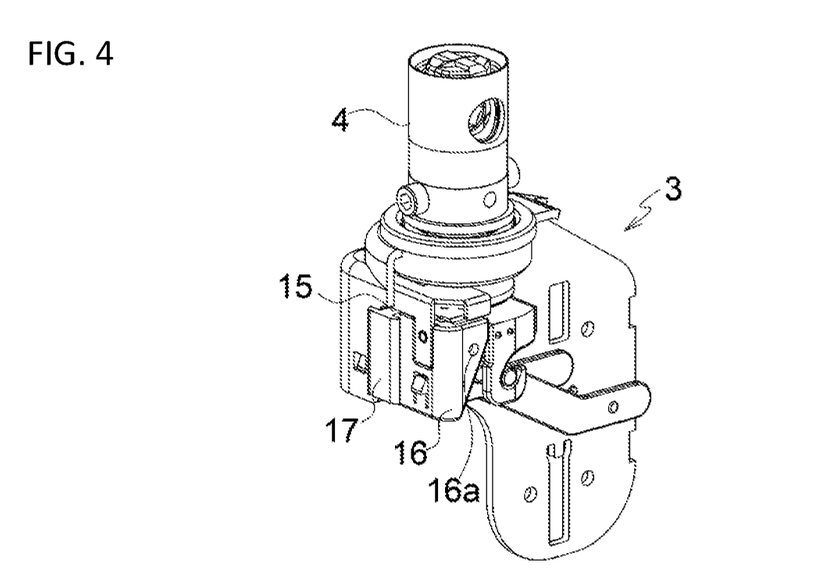
FIG. 4 is an exploded perspective view of a state where a fixing shaft is disposed.
Figure 5:
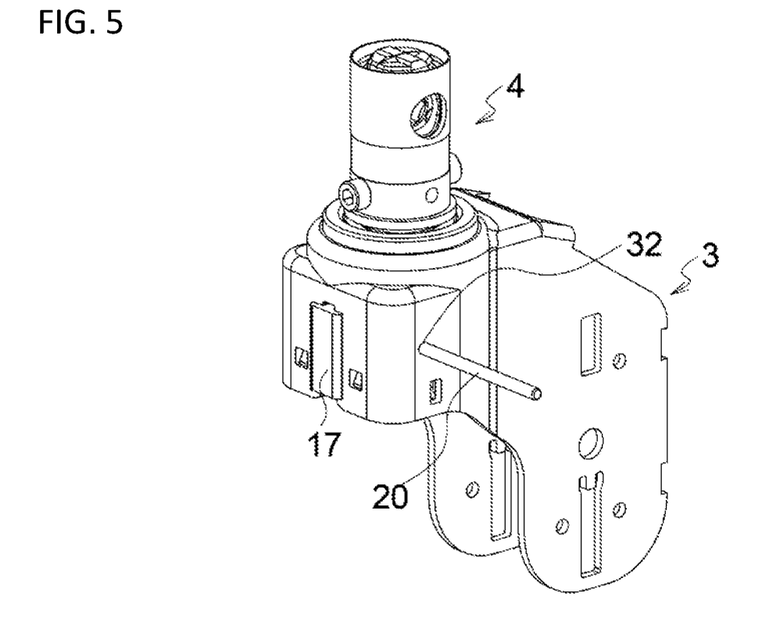
FIG. 5 is a perspective view of a gear transmission mechanism of the fixing shaft.
Figure 6:
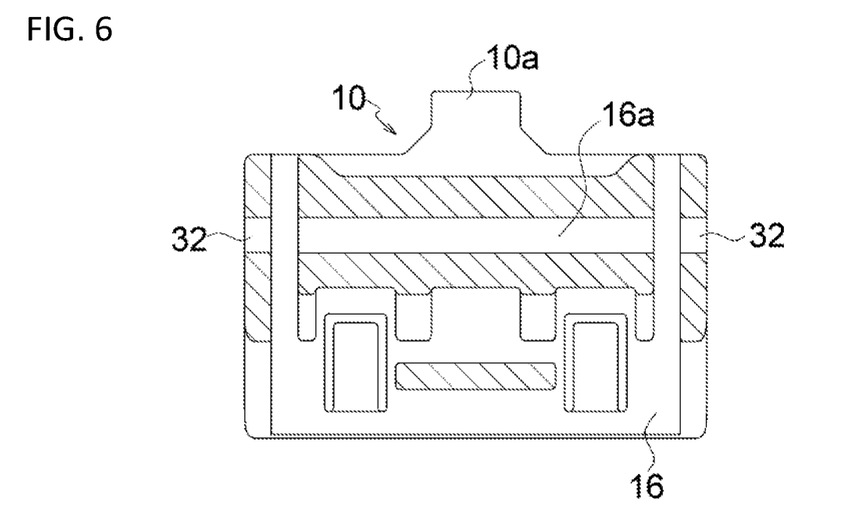
FIG. 6 is a cross-sectional view showing the support yoke and a through hole of the support member.

Consequently, the brake plate 25 moves down (see FIG. 2), and the braking protruding part 14 provided on the lower portion of the brake plate 25 also moves down and engage with the engagement receiving part 13 of the wheel 2.

As describe above, the downward movement of the operating shaft 8 doubly enables braking of the tread surface of the wheel 2 based on the downward movement of the brake shoe part 11 and braking of the engagement receiving part 13 of the wheel 2 based on the downward movement of the brake plate 25.

Further, in this embodiment, since the upper and lower engagement claw parts 10a and 10b are provided to the engagement member 10, when the operating shaft 8 is displaced to a swivel regulating position (moves up from the neutral position), the upper locking part 10a engages with the receiving part 9a on the upper surface of the swivel-preventing plate part 9, thereby regulating the swiveling only.

When the operating shaft 8 is displaced to a swivel regulating/braking position (moves down from the neutral position), the lower locking claw part 10b engages with the receiving part 9b on the lower surface of the swivel-preventing plate part 9 to regulate the swiveling, thus performing the above-described double braking at the same time.

Figure 1:
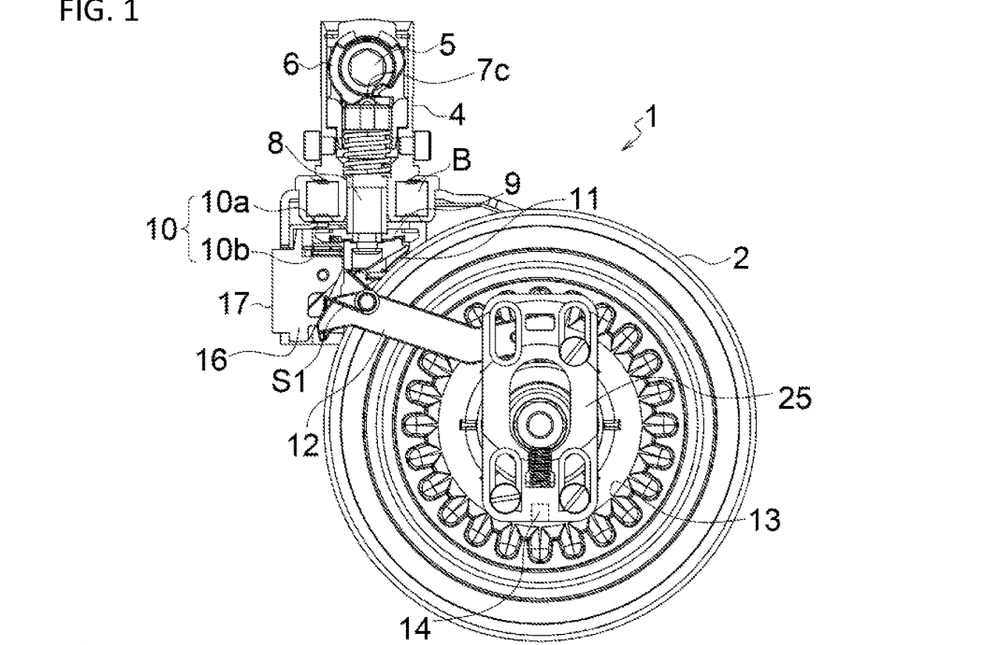
FIG. 1 is a side elevation of an unlocked caster in which a support yoke is omitted.

Furthermore, at the neutral position, an unlocked state is achieved (see FIG. 1).

In this embodiment, although the link cam 12 moves in the clockwise direction, it may move in the counterclockwise direction (not shown).

In this case, the braking protruding part 14 of the brake plate 25 could be provided to an upper portion of the brake plate 25.

Figure 8:
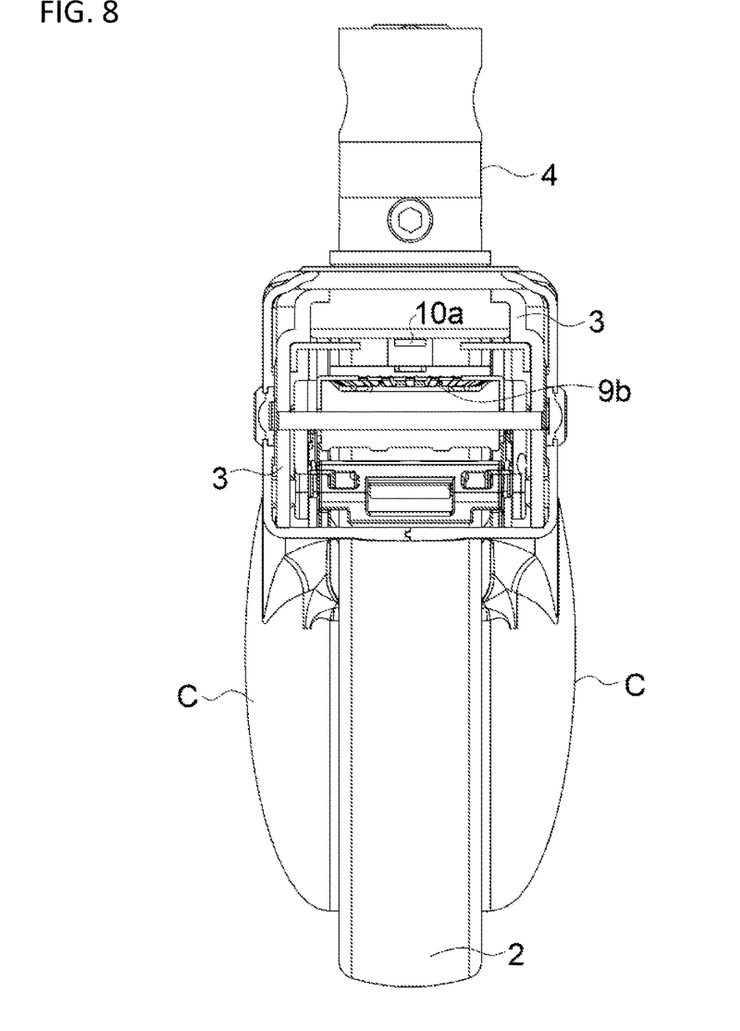
FIG. 8 is a longitudinal cross-sectional view of the caster.

Moreover, reference sign C denotes a cover which covers the support yoke 3 and the wheel 2 except its tire part (see FIG. 8).

The fixing shaft 20 can be restrained by providing the cover C so that it does not come off on the outer side.

Additionally, the link cam could be pivotally attached to a member fixed to the brake shoe part.

Further, in the present invention, it is preferable to provide the link cams and the brake plates on both the left and right sides of the wheel, but these member may be provided on one side.

The present invention is not restricted to the structure of the foregoing embodiment, and its design can be modified in many ways without changing a gist of the present invention as a matter of course.

REFERENCE SIGNS 1 double-lock caster
2 wheel
3 support yoke
4 stem
5 rotary shaft
6 cam
7 cam surface
8 operating shaft
9 swivel-preventing plate part
9a receiving part on an upper surface
9b receiving part on a lower surface
10 engagement member
10a engagement claw part (upper)
10b engagement claw part (lower)
11 brake shoe part
12 link cam
13 engagement receiving part
14 braking protruding part
15 slit
16 support member
17 rail part
18 hole
19 through hole
20 fixing shaft
21 hook part
22 pivot
23 gear part
24 groove
25 brake plate
26 restraint part
31 long hole

The invention claimed is:

1. A double-lock caster comprising: a stem erected on a support yoke which pivotally supports a wheel; a cam which is incorporated in an upper part of the stem and rotates by a rotary shaft; a plurality of braking and braking release cam surfaces formed at predetermined positions on an outer peripheral surface of the cam; an operating shaft which abuts against the cam surfaces and slides up and down; a swivel-preventing plate part fixed to a lower end of the operating shaft; an engagement member which is fixed to the support yoke, and engages with the swivel-preventing plate part to regulate swiveling of the support yoke; a brake shoe part which is fixed to a lower part of the swivel-preventing plate part, and abuts against a tread surface of the wheel by downward movement of the operating shaft to perform braking; a link cam which is coupled with the brake shoe part, and has one end side pivotally supported by a bearing part extending to an outer side of the wheel and the other end side being latched on a brake plate which slides up and down along an outer surface of the support yoke; and a braking protruding part which is provided on the brake plate and engageable with an annularly continuous engagement receiving part formed on an inner peripheral side surface of the wheel, wherein downward movement of the operating shaft causes the engagement member to engage with the swivel-preventing plate part and causes the brake shoe part to abut against the tread surface of the wheel and, at the same time, pivotal movement of the link cam causes the brake plate to slide so that the braking protruding part engages with the engagement receiving part of the wheel, thereby performing swivel regulation and double braking;

wherein a vertically extending slit is formed in a back surface of the support yoke, and a rail part having a T-shaped cross section is provided to protrude on a back surface of a support member which supports the engagement member, a central piece of the rail part is inserted into the slit to latch the support member on the support yoke, and a fixing shaft is press-fitted into a hole laterally piercing through the support yoke and the support member to fix the engagement member to the support yoke through the support member.

2. The double-lock caster according to claim 1,
wherein a through hole which communicates with holes provided in side surfaces of the support yoke and laterally extends is provided in the support member, a part of the hole of the through hole is set to a press fitting dimension, and the engagement member is fixed to the support yoke through the support member by press-fitting the fixing shaft.

3. The double-lock caster according to claim 1,
wherein the swivel-preventing plate part is formed into a plate-shape, and has engagement receiving parts provided on an upper surface and a lower surface thereof, and
the engagement member has a pair of engagement parts which are vertically apart from each other, the receiving part on the upper surface of the swivel-preventing plate part becomes engageable with the upper engagement part by a displacement of the operating shaft, and the receiving part on the lower surface of the swivel-preventing plate part becomes engageable with the lower engagement part by a further displacement of the operating shaft.

4. The double-lock caster according to claim 2,
wherein the swivel-preventing plate part is formed into a plate-shape, and has engagement receiving parts provided on an upper surface and a lower surface thereof, and
the engagement member has a pair of engagement parts which are vertically apart from each other, the receiving part on the upper surface of the swivel-preventing plate part becomes engageable with the upper engagement part by a displacement of the operating shaft, and the receiving part on the lower surface of the swivel-preventing plate part becomes engageable with the lower engagement part by a further displacement of the operating shaft.

5. The double-lock caster according to claim 1,
wherein the swivel-preventing plate part is formed by a cold forging process, and the engagement receiving part on the lower surface is formed of many annularly continuously arranged irregularities, and grooves are provided along proximal ends of convex gear parts respectively.

6. The double-lock caster according to claim 2,
wherein the swivel-preventing plate part is formed by a cold forging process, and the engagement receiving part on the lower surface is formed of many annularly continuously arranged irregularities, and grooves are provided along proximal ends of convex gear parts respectively.

7. The double-lock caster according to claim 3,
wherein the swivel-preventing plate part is formed by a cold forging process, and the engagement receiving part on the lower surface is formed of many annularly continuously arranged irregularities, and grooves are provided along proximal ends of convex gear parts respectively.

8. A double-lock caster comprising: a stem erected on a support yoke which pivotally supports a wheel; a cam which is incorporated in an upper part of the stem and rotates by a rotary shaft; a plurality of braking and braking release cam surfaces formed at predetermined positions on an outer peripheral surface of the cam; an operating shaft which abuts against the cam surfaces and slides up and down; a swivel-preventing plate part fixed to a lower end of the operating shaft; an engagement member which is fixed to the support yoke, and engages with the swivel-preventing plate part to regulate swiveling of the support yoke; a brake shoe part which is fixed to a lower part of the swivel-preventing plate part, and abuts against a tread surface of the wheel by downward movement of the operating shaft to perform braking; a link cam which is coupled with the brake shoe part, and has one end side pivotally supported by a bearing part extending to an outer side of the wheel and the other end side being latched on a brake plate which slides up and down along an outer surface of the support yoke; and a braking protruding part which is provided on the brake plate and engageable with an annularly continuous engagement receiving part formed on an inner peripheral side surface of the wheel,
wherein downward movement of the operating shaft causes the engagement member to engage with the swivel-preventing plate part and causes the brake shoe part to abut against the tread surface of the wheel and, at the same time, pivotal movement of the link cam causes the brake plate to slide so that the braking protruding part engages with the engagement receiving part of the wheel, thereby performing swivel regulation and double braking;
wherein a pair of hook-shaped bearing parts which extend downward on outer sides of left and right side surfaces of the wheel and have folded distal ends are provided to the brake shoe, a protruding pivot is born by the hook parts in the vicinity of a proximal end of the link cam, and a distal end of the link earn is locked to a pair of brake plates which slide up and down along outer surfaces of left and right side surfaces of the support yoke.

9. The double-lock caster according to claim 8,
wherein a through hole which communicates with holes provided in side surfaces of the support yoke and laterally extends is provided in the support member, a part of the hole of the through hole is set to a press fitting dimension, and the engagement member is fixed to the support yoke through the support member by press-fitting the fixing shaft.

* * * * *